(12) United States Patent
Reith et al.

(10) Patent No.: US 8,720,876 B2
(45) Date of Patent: May 13, 2014

(54) CLAMPING DEVICE FOR HOLDING AND CLAMPING COMPONENTS

(75) Inventors: Stefan Reith, Hofbieber (DE); Christian Koerbel, Kuenzell (DE)

(73) Assignee: Edag GmbH & Co. KGAA, Fulda (DE)

( * ) Notice: Subject to any disclaimer, the term of this patent is extended or adjusted under 35 U.S.C. 154(b) by 995 days.

(21) Appl. No.: 12/294,772

(22) PCT Filed: Mar. 28, 2007
(Under 37 CFR 1.47)

(86) PCT No.: PCT/EP2007/002745
§ 371 (c)(1),
(2), (4) Date: May 26, 2010

(87) PCT Pub. No.: WO2007/110235
PCT Pub. Date: Oct. 4, 2007

(65) Prior Publication Data
US 2010/0252973 A1 Oct. 7, 2010

(30) Foreign Application Priority Data
Mar. 28, 2006 (DE) .......................... 10 2006 014 279

(51) Int. Cl.
*B23Q 1/64* (2006.01)
(52) U.S. Cl.
USPC .......................................................... 269/57
(58) Field of Classification Search
USPC ............... 269/287, 277, 219, 114, 3, 37, 249; 72/50, 84, 447
See application file for complete search history.

(56) References Cited

U.S. PATENT DOCUMENTS

| | | | |
|---|---|---|---|
| 5,427,364 A * | 6/1995 | Zborschil | 269/166 |
| 5,479,698 A | 1/1996 | Angel | |
| 5,781,977 A * | 7/1998 | Servones | 29/259 |
| 6,431,534 B1 * | 8/2002 | Orosz et al. | 269/43 |
| 7,152,292 B2 | 12/2006 | Quell et al. | |
| 2007/0018370 A1 * | 1/2007 | Reissenweber | 269/86 |

FOREIGN PATENT DOCUMENTS

| | | |
|---|---|---|
| DE | 103 38 170 | 3/2005 |
| EP | 1 420 908 | 5/2004 |
| EP | 1 685 915 | 1/2006 |
| FR | 2 843 708 | 2/2004 |
| JP | 06 047557 | 2/1994 |
| JP | 07 068324 | 3/1995 |

\* cited by examiner

*Primary Examiner* — Lee D Wilson
*Assistant Examiner* — Jamal Daniel
(74) *Attorney, Agent, or Firm* — RatnerPrestia

(57) ABSTRACT

A clamping device for components to be joined, which clamping device comprises: a first component holder for a first component, a second component holder for a second component, and a clamping structure which secures the component holders relative to one another in a joining position, and when the component holders are in the joining position, the clamping structure extends from an external face of the first component holder to an external face of the second component holder facing away from the external face of the first component holder and extends respectively around a peripheral edge of the component holders.

28 Claims, 10 Drawing Sheets

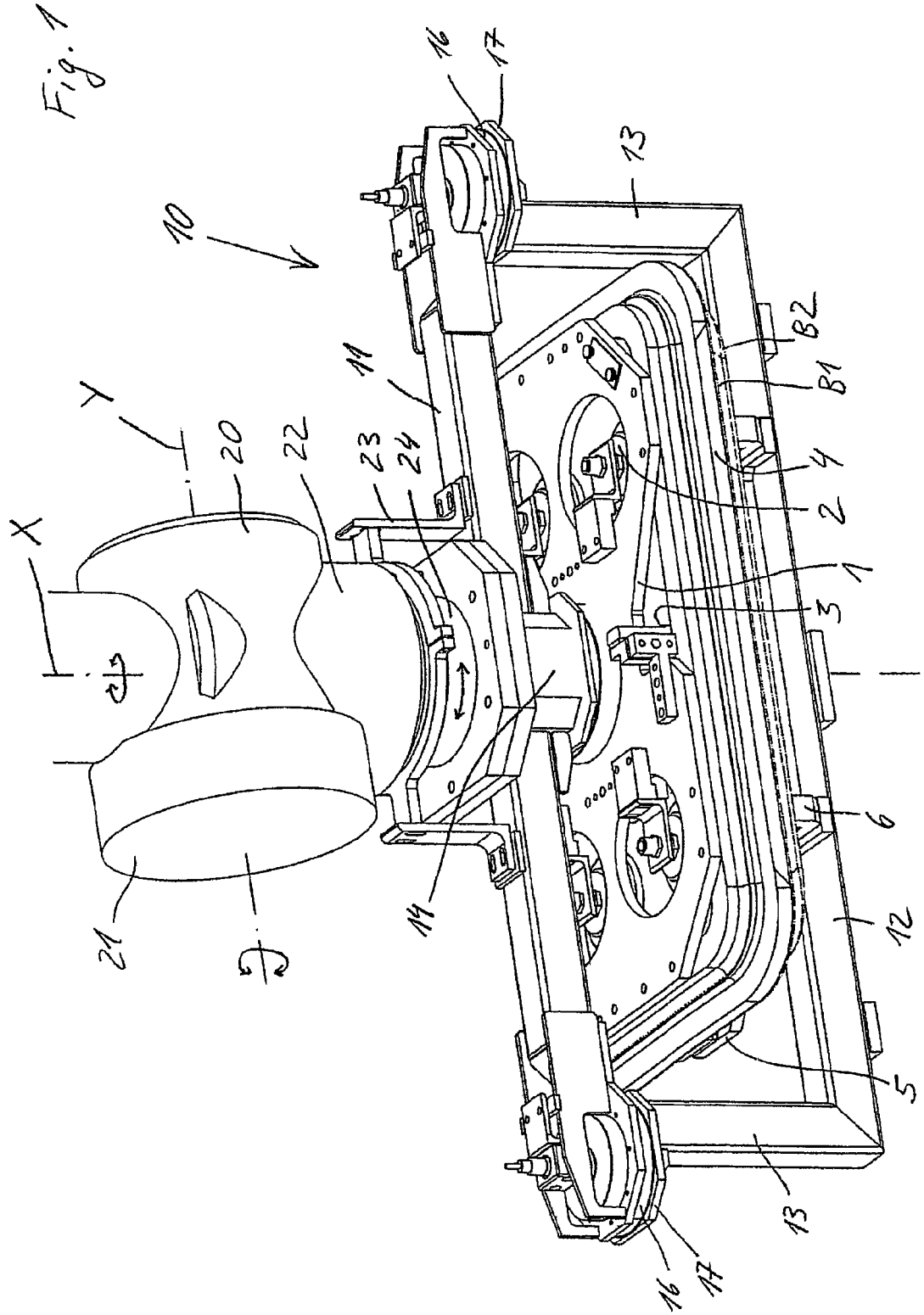

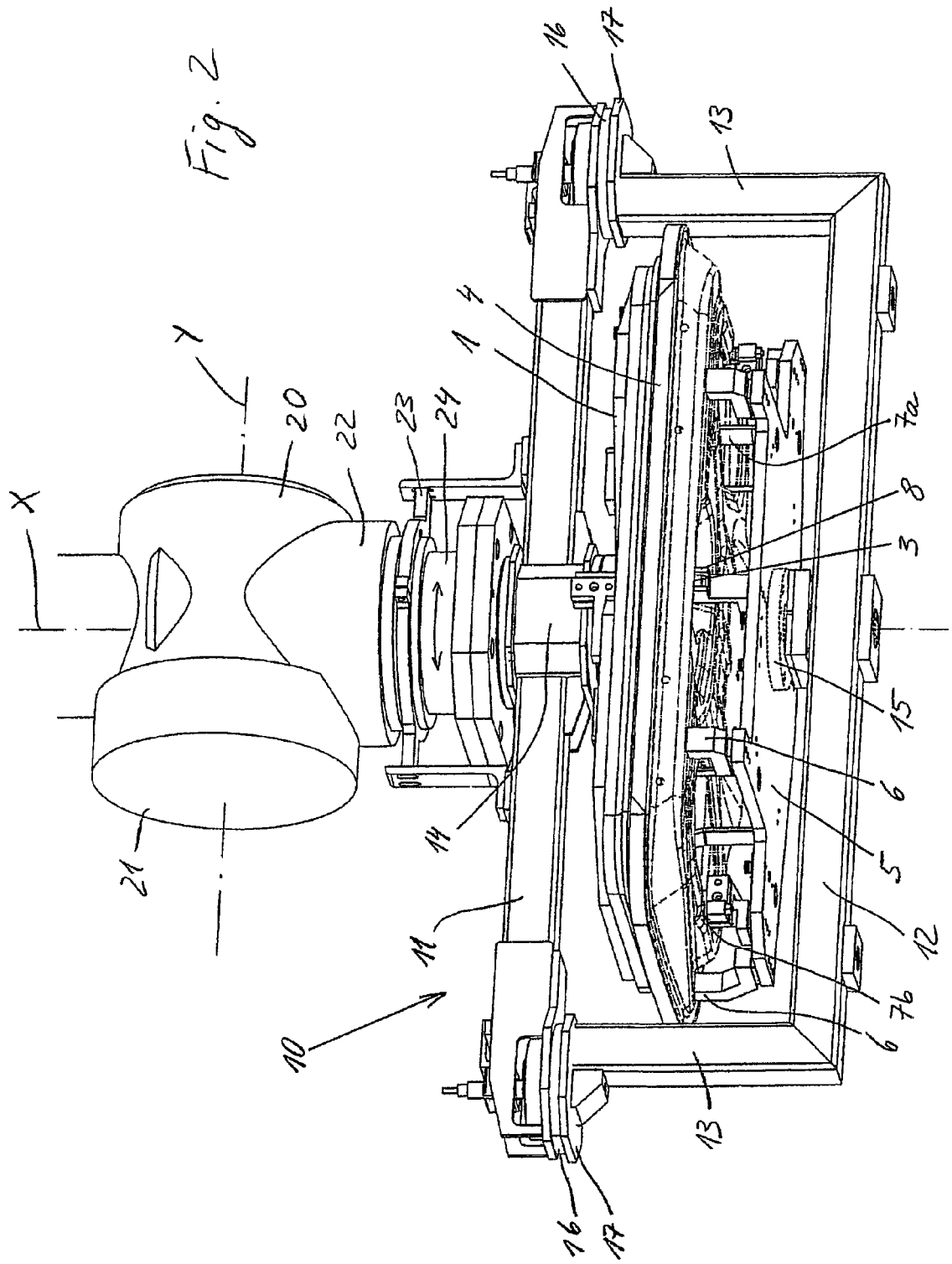

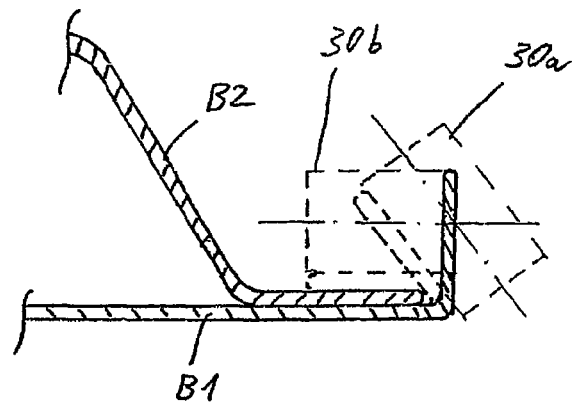
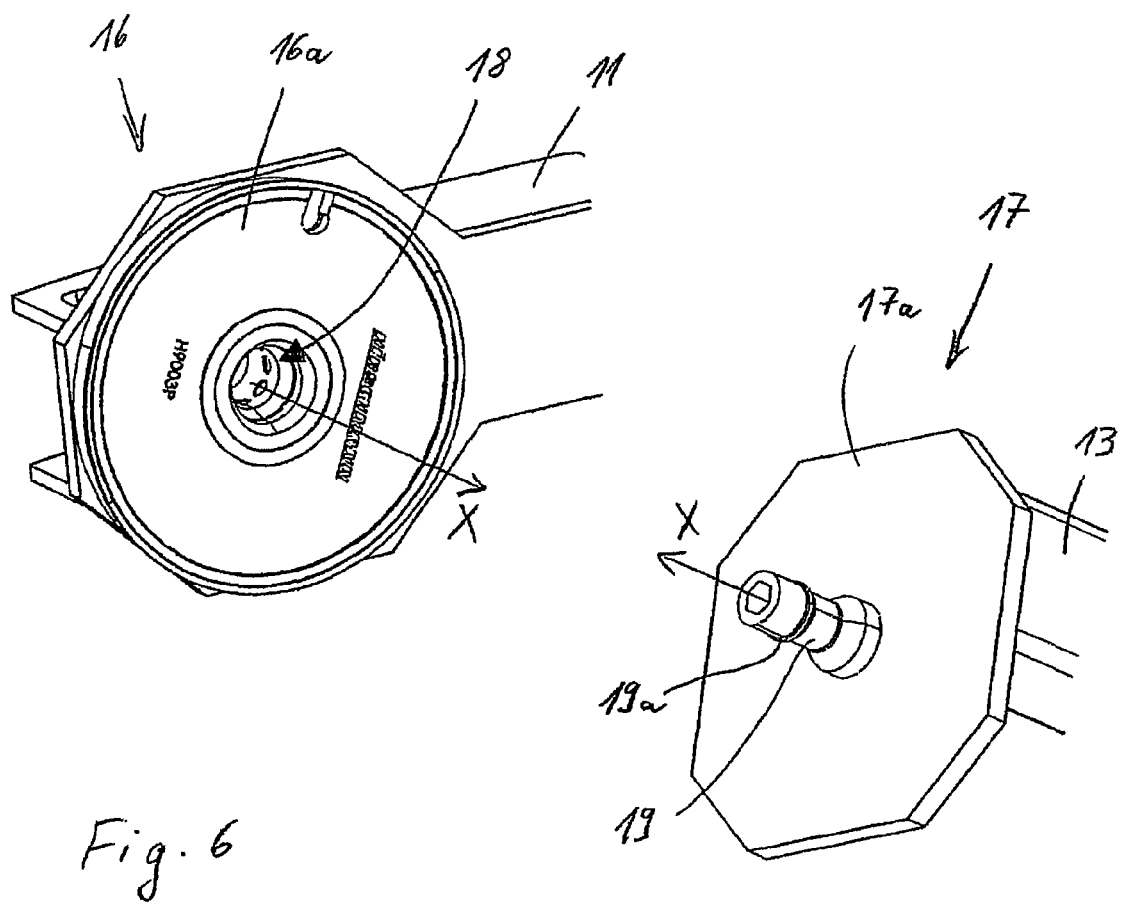

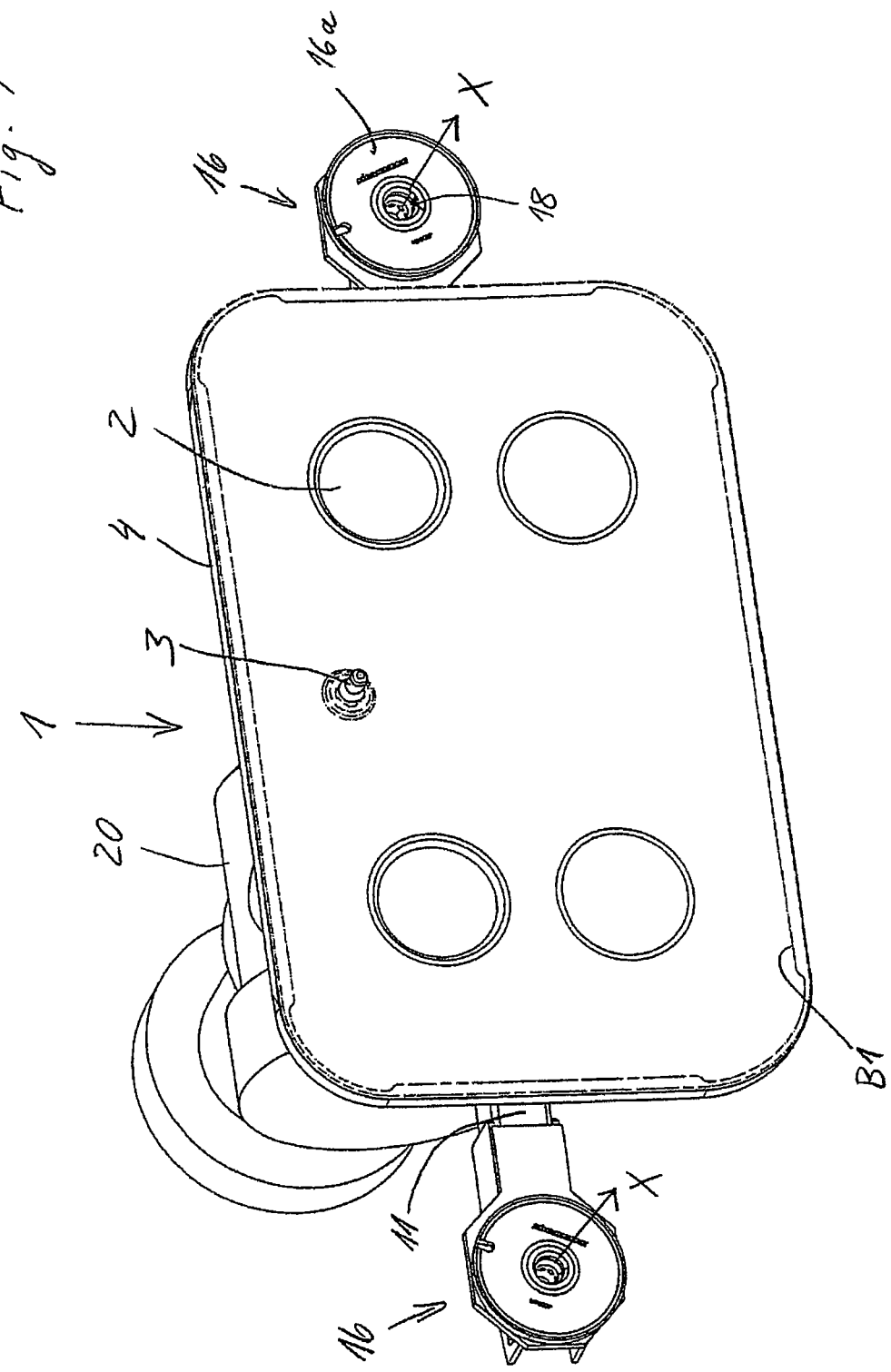

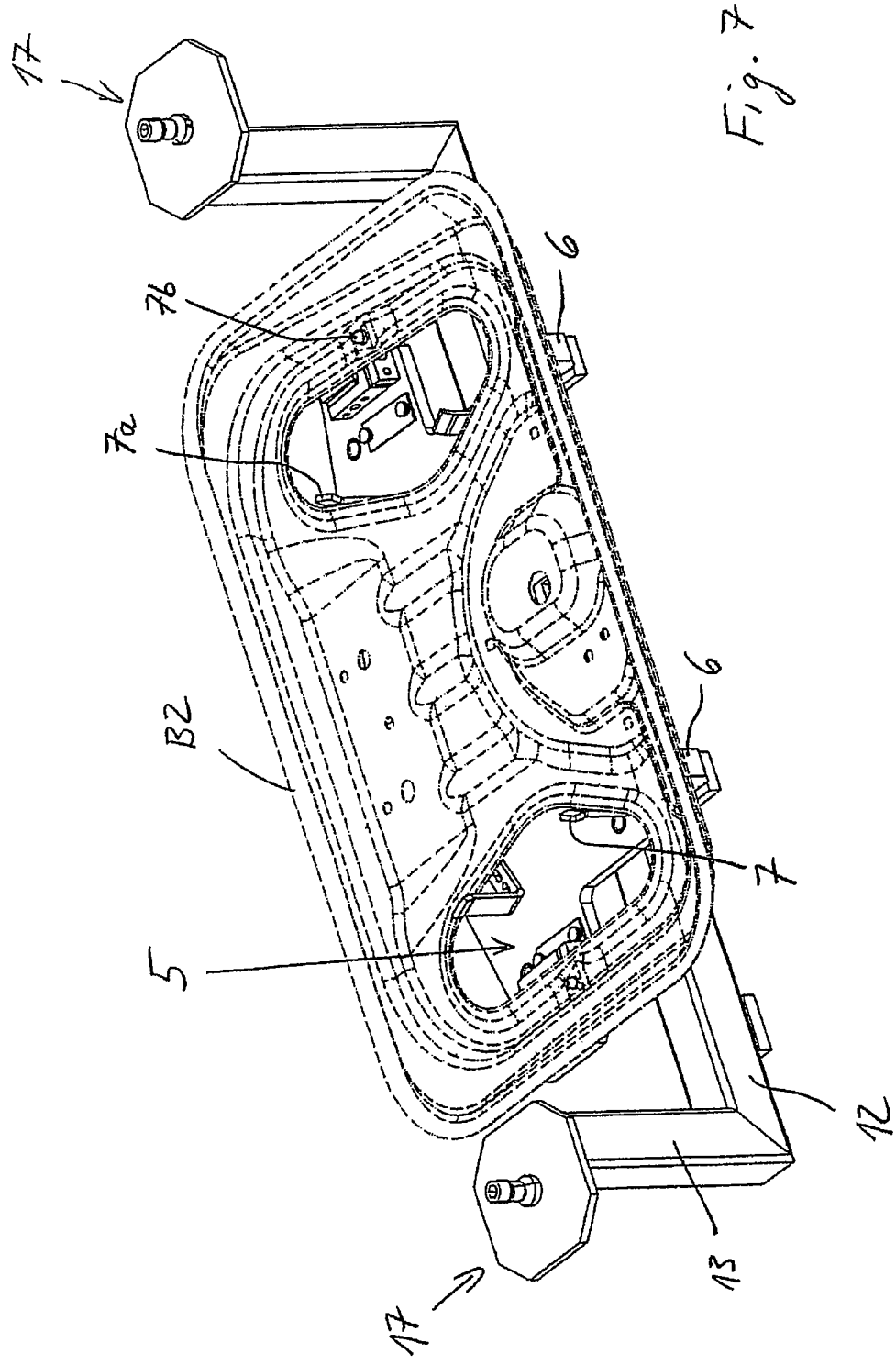

CLAMPING DEVICE FOR HOLDING AND CLAMPING COMPONENTS

This application is the U.S. national phase application of PCT International Application No. PCT/EP2007/0027457, filed Mar. 28, 2007, which claims priority to German Patent Application No. DE102006014279.9, filed Mar. 28, 2006, the contents of such applications being incorporated by reference herein in their entirety.

BACKGROUND OF THE INVENTION

1. Field of the Invention

The invention relates to a device for clamping components to be joined to one another, a clamping device part as such, a joining device with a joining tool for joining the components, preferably by hemming, as well as a joining method. The invention may be used in particular for roller hemming sheet metal structures, preferably in the automotive industry. One particularly preferred application is that of mass-producing chassis or chassis parts, in particular attaching parts, of automotive vehicles.

2. Description of the Related Art

In order to join components, the components are clamped relative to one another in a joining position by means of clamping devices. In the joining position, the components assume a position relative to one another which they will assume in the joined unit to be produced. During the joining process, the clamped components are held permanently secured to one another. The clamping device generally hampers accessibility to the components which are to be mutually joined and constitutes a disruptive contour for the joining unit performing the joining process. During hemming, which is the preferred application of the invention, this causes problems, especially when hemming along a path along an outer peripheral edge of the components to be joined to one another which runs back on itself.

SUMMARY OF THE INVENTION

It is an objective of the invention to avoid that disruptive contours are created by clamping components to be joined.

A clamping device of the type to which an embodiment of the invention relates comprises a first component holder for a first component, a second component holder for a second component and a clamping structure, which clamps and thus secures the component holders relative to one another in a joining position. When the component holders are in the joining position, the components held relative to one another by the component holders likewise assume the joining position which they assume in the permanently fixed joined unit once the joining process has been run. One or both component holders may grip the respective component, for example with one or more clamping grips or suction grips or optionally a combination of different grips. By preference, only one of the component holders grips the relevant component. The other component holder preferably holds its component only loosely and the relevant component merely lies on support surfaces of the component holder but is not clamped. The component holders each have an internal face in contact with the component and an opposing external face remote from the internal face. The component holders are preferably flat structures. The respective thickness as measured in the direction of a plan view onto the respective external face is significantly smaller in each case than the length and width as measured in the plane of the plan view. The same preferably applies to the components. The component holders preferably each have a support with one or more functional parts on the respective support which are used to hold the respective component. The functional components may be the grips already mentioned above or support surfaces or positioning elements used to position the components. One of the component holders advantageously serves as a support bed, which is able to absorb the forces needed for the joining process as such. A preferred embodiment is a hemming bed, which supports the edge of the component to be folded. The support may be dish-shaped or plate-shaped in particular, or alternatively may also be of a net or lattice design, and within the meaning mentioned above is preferably a flat structure. In the joining position, the internal faces of the component holders lie facing one another and the peripheral edge runs completely around the internal faces. The external faces are directed away from one another.

As proposed by at least one embodiment of the invention, the clamping structure encloses the component holders when they assume the joining position relative to one another. The clamping structure extends from the external face of the first component holder to the external face of the second component holder and therefore extends round a peripheral edge of the two component holders. The clamping structure is guided outwards respectively from an inner region of the component holders surrounded by the peripheral edge and via which the clamping force is transmitted to the respective component holder.

The clamping structure may be of an arching type shape or at least form an arch, and the arch or several arches extends or extend around the peripheral edge of the component holders. In particular, it may have a shape in the form of a double arch, i.e. a frame which extends round the component holders on two sides of the peripheral edge. The arch or arches or the frame preferably forms or form an at least partially two-dimensional pattern so that, in the case of a multiple arch, for example in the case of the preferred frame, the several arches or the frame extend or extends around the component holders at opposing sides of the peripheral edge facing away from one another. A frame is preferable to a single arch due to its higher mechanical strength. A single arch, on the other hand, forms fewer disruptive contours.

Since the clamping structure extends round the peripheral edge of the component holders, preferably at a distance from them, the peripheral edge is accessible everywhere, at least in principle. In order to improve accessibility still further, the component holders secured relative to one another in the joining position and the clamping structure can be moved relative to one another, and the ability to move is such that the position of at least a clamping structure region extending round the peripheral edge or preferably the position of the clamping structure as a whole can be varied in the longitudinal direction of the peripheral edge due to the relative movement. In preferred embodiments, the clamping structure is displaceably connected to the component holders in such a way that a joining tool can be moved from a start position in a revolution extending in space about an axis over 360°, preferably in an intrinsically closed circuit, around the region of the component holders where the clamping structure is supported in order to transmit the clamping force during the joining process. During the revolution, the clamping structure is able to run ahead or back by at least a distance in the same direction so that the joining tool can be moved from the clamping structure back into the start position unhindered. However, it is also of advantage to use a clamping structure extending round the peripheral edge where the path along which the components have to be joined is not closed. The relative displaceability is also of advantage in these situations in order to avoid obstructing the joining tool.

In order to generate the relative movement between the clamping structure and the component holders, either the clamping structure or the component holder unit comprising the component holders is disposed stationary in a joining station, i.e. so that it can not move, and the respective other one can be moved. Alternatively, the relative movement may also be generated by a co-ordinated movement of both the clamping structure and the component holders. In preferred embodiments, the component holders are disposed so that they can move in the joining station for the joining process. In such embodiments, the components clamped relative to one another in the joining position are moved in space relative to a joining tool during the joining process. In the preferred extreme situation, the joining tool is disposed so that it is stationary in the joining station and it is only the clamping device or only the component holders which are moved relative to the joining tool conforming to the contour of the peripheral edge. In this sense, the invention specifically relates to a "flying joining operation". Where movements of the joining tool, component holders and clamping structure are not explicitly specified in terms of spatial direction, what is meant is movements of these components relative to one another and it is left open which of the components effects or effect an absolute movement.

The clamping device is preferably used in conjunction with a joining device, by means of which the components are joined to one another along the common peripheral edge. The joining device is preferably a hemming device, more particularly preferably a roller hemming device, but may alternatively also be a welding device, brazing unit or bonding device.

In preferred embodiments, the clamping device is disposed on an actuator which can be moved in space. It is preferable if the actuator can be moved freely in space in translation in all three degrees of freedom and in rotation in all three degrees of freedom. In particular, the actuator may be a robot arm, to the end of which the clamping device is attached. In a first embodiment, the actuator produces the relative movement between the clamping structure and the component holders disposed in the joining position. In this case, one of the component holders is connected to one of the motional axes of the actuator and the clamping structure is connected to another one of the motional axes of the actuator, in each case unable to move with respect to the respective axis. In such embodiments, if, as preferred, the actuator is a robot arm with several rigid joint elements disposed one after the other from a base of the robot to the end of the robot arm, the clamping structure or preferably the relevant component holder can be fixedly attached to the last joint element in the kinematic chain of these joints, i.e. at the farthest distance from the robot base, whilst the other of the two components can be fixedly connected to another, preferably the penultimate, joint element of the actuator. The last and the penultimate joint elements together constitute the link of the kinematic chain farthest away from the robot base. In alternative second embodiments, one of the component holders is fixedly connected to one of the motional axes of the actuator, whilst the clamping structure has an additional, separate degree of freedom of movement, so to speak a 7th degree of freedom. In the second embodiments, the clamping device has a separate drive in addition. In conversing the relations, the clamping device may be fixedly connected to a motional axis of the actuator and the component holder may be moved by means of an additional drive. In the first embodiments, the clamping structure is tied to the actuator, so to speak, namely in terms of the degree of freedom of movement of the joint element to which the component holders are attached. The clamping structure does not have the degree of freedom of this joint element. In the second embodiments, the clamping structure effects all the movements of the component holders but does not have an additional degree of freedom of movement and movements in the context of the additional degree of freedom are superimposed on the actuator movement.

If the position of a region of the clamping structure extending round the peripheral edge of the component holders can be varied relative to the peripheral edge, it is not necessary for the entire clamping structure to be displaceable relative to the peripheral edge but rather only the relevant region. The relevant region may be displaceably attached to a clamping structure arm for example, which extends out from a central region in the direction of the peripheral edge, and may be linearly displaceable, for example, or preferably displaceable in a pivoting movement. It is more preferable if not only an outer region of the clamping structure is able to move relative to the component holders but the clamping structure as a whole. As regards the ability of the clamping structure as a whole to move, a pivoting movement or a rotating movement is preferred. Alternatively, however, the clamping structure as a whole may also be linearly displaceable relative to the component holders and to this end is provided in the form of a linearly displaceable slide for example. Where the displaceability of the clamping structure or only an outer clamping structure is described above, this is also intended to include the situation of relative displaceability where the clamping structure remains stationary during the joining process and the component holders can be moved in order to change position instead. This is also a preferred way of achieving a relative movement of the clamping structure.

In a preferred embodiment, the clamping force is transmitted to the component holders at one point only in each case, preferably via a short pillar respectively, i.e. a base. A longitudinal axis of the pillar may advantageously also constitute a rotation or pivot axis of the clamping structure. In the case of components with a large surface area, it may be of advantage if the clamping force is transmitted to the component holders at several points, preferably likewise by means of a short pillar in each case. Again in these embodiments, the clamping structure may be a coherent or connected structure with one or more regions which are able to move relative to the component holders. Alternatively, several clamping structures of the type described above may be provided in order to clamp the component holders relative to one another. If several clamping structures are able to move relative to the component holders to enable a tool to effect a revolution in spite of their regions extending round the peripheral edge, as preferred, the clamping structures or respectively only the movable region of the clamping structures may be equipped with separate drives, or the relative movements are generated by means of a gear system. If using several clamping structures or clamping structure regions which do not move uniformly, several joining tools may be used, in which case each will effect only a partial revolution.

In preferred embodiments, the clamping structure is of a multi-part design with a first structure part and at least one other, second structure part. The first structure part and the second structure part may be connected to one another permanently so that they are able to move relative to one another. In such embodiments, the components are taken up in an extracted state of the structure parts, and the structure parts incorporating the component holders and the components held in the joining position can be moved towards one another and secured to one another. More preferably, the first structure part and the second structure part are fixedly connected to one another by means of a coupling in order to clamp the components but the connection is releasable so that the first structure part incorporating the co-operating first component holder and the second structure part incorporating the co-operating second component holder can each be manipulated separately and independently of one another, in particular for holding the components. The clamping structure may have one or more other structure parts which can be permanently secured to and moved with one of said two structure parts or alternatively each is or are connected by a coupling of the described type. However, the clamping structure preferably comprises only the first and the second structure part, i.e. it preferably comprises two parts.

The coupling for connecting the structure parts comprises a first coupling half connected to the first structure part and a second coupling half connected to the second structure part. The coupling halves are advantageously designed so that they can be moved into a coupled engagement by a linear movement. The direction of the linear movement preferably coincides with the direction of the clamping force with which the components are pressed towards one another into the joining position by means of the clamping structure, preferably directly one against the other. The coupling halves are preferably shaped so that they pull firmly on one another when the coupled engagement is established, or claw firmly as it were, thereby generating the clamping force. Of the coupling halves, one is preferably a coupling finger and the other a coupling recess, which establish the coupled engagement with one another. When the coupling is in the state in which the coupling halves are connected, it preferably forms a plug-and-socket connection. The coupling half incorporating the coupling recess preferably has at least one engaging element and this engaging element is disposed transversely to the direction in which the coupling halves are moved into the coupled engagement, i.e. transversely to the clamping direction, preferably perpendicular to the clamping direction or with an inclination to the clamping direction. The at least one engaging element can advantageously be blocked in the coupled engagement. In these embodiments, the relevant coupling half has at least one blocking element and this blocking element is mounted so that it can be displaced forth and back between a blocking position and a release position. In the blocking position, the blocking element prevents the at least one engaging element from being able to move out of the coupled engagement. The coupled engagement is only possible when the blocking element is in the release position. The blocking and releasing operations are advantageously effected by a control system, for practical purposes an actuator control, for example purely mechanically or preferably electrically or pneumatically.

The invention relates to a clamping device with a multi-part clamping structure as well as a single clamping device part as such. The clamping device part comprises either the first component holder with the first structure part or the second component holder with the second structure part. The explanations given above in connection with the designs of the clamping device as a whole also apply to the clamping device part. The clamping device part as such also comprises the structure part of the clamping structure which is connected to the relevant component holder.

In the case of the design based on clamping device parts with coupling halves, which are complete in the sense that they establish the coupled engagement through pure contact, which should be such that they can be blocked in order to secure as well as facilitate the release of the coupled engagement, the clamping device is best suited for use in mass production facilities with short cycle times. To this end, the coupling halves are advantageously shaped and disposed on the relevant clamping device part so that the coupled engagement can be established by a simple movement of one clamping device part relative to the other, preferably by means of a short-stroke linear movement. In the preferred embodiments, it is sufficient simply to establish the coupled engagement in order to clamp the component holders and hence the held components relative to one another in the joining position. If, for example, the first component holder is attached to an actuator which can be freely moved in space, preferably a robot arm, a first component can be held by the first component holder by positioning the first component holder relative to the relevant first component and picking up and holding the first component in order to pick up the second component holder and hence with it also the second component by means of the first component holder, namely by simply establishing the coupled engagement. It is also of particular advantage that the second component holder not only serves as a means for supporting a second component but can also be used in another function as a removal device on completion of the joining process in that the first component holder releases the first component and hence the joined unit obtained from the components at the end of the joining process. Having been released, the joined unit can then be removed from the second component holder. The first component holder is already free again and is ready to hold the next first component, for example.

In a first embodiment, the second clamping device part is mobile so that, after picking up it constitutes the clamping device together with the first clamping device part and can be moved in space to the joining tool and can also be moved in space relative to the joining tool according to the geometry of the join to be produced in order to join the components. In a second embodiment, the second clamping device part is stationary whilst the components are being joined, whereas the joining tool is moved in space relative to the clamping device. In the second embodiment, the second clamping device part is disposed preferably permanently stationary in the joining station rather than just during the joining process.

Advantageous features are also described in the detailed description set forth below.

The features disclosed in connection with the clamping device with at least two component holders may advantageously also be used with a clamping device which has only one of the component holders, for example a flanging device used solely for flanging or folding a peripheral edge of a component. The flanging process may involve a roller hemming process, i.e. a joining process involving another component, but may also be used on its own simply for shaping. In such applications, the other component holder is preferably replaced by a pressing pad which presses the component to be processed into the flanging bed of the component holder.

BRIEF DESCRIPTION OF THE DRAWINGS

Examples of embodiments of the invention will be described below with reference to drawings. Features disclosed in connection with the example embodiments may advantageously be used individually and in any combination with the subject matter disclosed in the claims as well as the embodiments described above. Of the drawings:

FIG. 1 is a perspective view of a clamping device of a first example embodiment, FIG. 2 is another perspective view of the clamping device, FIG. 3 illustrates a hemming process, FIG. 4 illustrates a first half of the clamping device, FIG. 6 shows the coupling halves of the clamping device, FIG. 7 illustrates the second half of the clamping device with a held component.

DETAILED DESCRIPTION OF THE PREFERRED EMBODIMENTS

Figure 5:
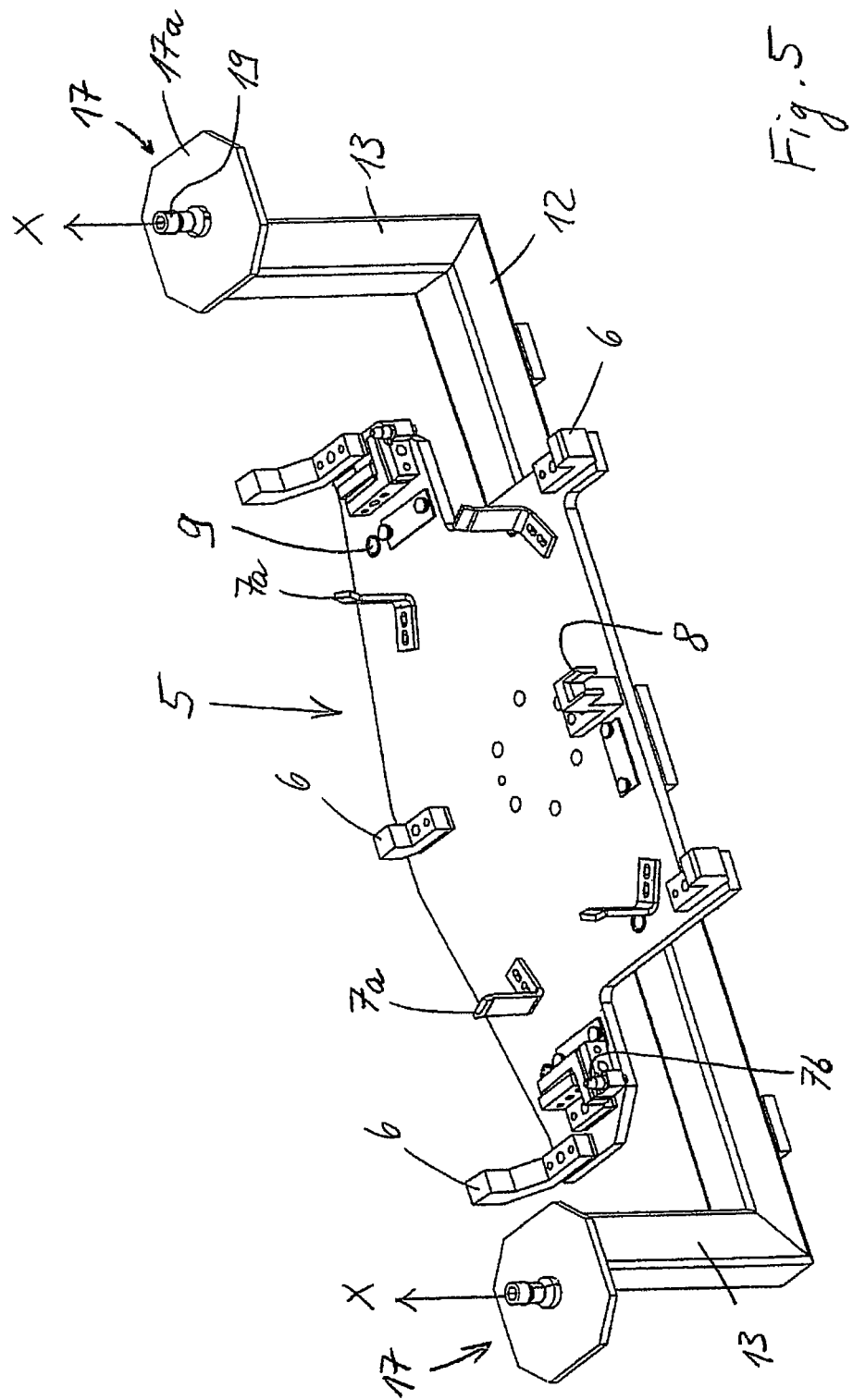
FIG. 5 illustrates a second half of the clamping device.

FIG. 1 illustrates a clamping device of the type used by preference for a flying joining process, in particular roller hemming, based on an example of a first embodiment. The clamping device is used to clamp two components B1 and B2 to be fixedly joined to one another along their outer peripheral edge to form a joined unit after the joining process. The clamping device clamps the components B1 and B2 relative to one another in a joining position which they also assume after the joining process. In the clamped state, the components B1 and B2 are joined along their outer peripheral edge, preferably by roller hemming. A single joining tool effects a complete revolution in order to produce the join. Alternatively, several tools may be distributed along the outer peripheral edge, each of which joins only a part-portion of the peripheral edge. During the preferred joining process based on roller hemming, several tool heads with hemming rollers set at differing angles of inclination or a single tool head operating with differently set hemming rollers simultaneously are used. A preferred example of such a hemming head is described in European patent application EP 06 001 600. As already explained in general terms in connection with joining tools, several such roller hemming heads may be distributed along the peripheral edge of the components B1 and B2, each of which effects only a partial revolution. In the case of the flying joining process, the joining tool or several joining tools are disposed so as to be stationary in a joining station and the revolution is effected by a corresponding movement of the components B1 and B2 disposed in the joining position relative to one another. An example of such a joining process is disclosed in patent specification DE 103 38 170 B4 and is incorporated herein by way of reference.

The clamping device comprises a first component holder 1 for the component B1 and a second component holder 5 for the component B2. Components B1 and B2 are sheet metal structures. Component B1 is an outer panel and component B2 is an inner panel for a motor vehicle attaching part, for example a door. Accordingly, the component holders 1 and 5 are also flat structures with a length and a width which are bigger than the thickness of the relevant structure by a multiple. The component holder 1 has a support, which is provided in the form of a support plate in this example of an embodiment, denoted by reference number "1" in the drawings, which serves as a hemming bed in the preferred use of roller forming. The support bed forms an inner face of the component holder 1 on which the component B1 sits, at least in a peripheral strip constituting the peripheral edge. The component holder 1 also has several grips 2, by means of which component B1 can be supported in a suspended arrangement. The grips 2 extend from an external face of the component holder 1 through orifices of the support and the support bed 4 and are disposed so that they can support the component B1 in a suspended arrangement on the support bed 4. The grips 2 are suction grips, and in the embodiment illustrated as an example are pneumatic suction grips, to which a negative pressure or an over-pressure can be selectively applied. The component holder 1 also has a positioning element 3, which is provided in the form of a centring pin in the embodiment illustrated as an example. The positioning element 3 extends from the external face of the component holder 1 through a cut-out of the support bed 4 and extends out from the internal face of the component holder 1 in the direction towards the second component holder 5.

FIG. 2 is a view of the clamping device looking onto the second component holder 5. The component holder 5 also has a support, provided in the form of a support plate for example, denoted by reference number "5" in the drawings. Disposed on the support are several support surfaces 6 and positioning elements 7a, 7b and 8. The held component B2 lies on the support surfaces 6. The support surfaces 6 form a support bed 6 for component B2. In a second function, the support surfaces 6 may also be used to position component B2 relative to the component holder 5. The positioning elements 7a serve as a guide as the component B2 is being set down and the other pin-type positioning elements 7b are used to position the component B2 more exactly relative to the component holder 5. In co-operation with the positioning element 3 of the first component holder 1, the positioning element 8 is used to position the component holders 1 and 5 relative to one another and in the embodiment illustrated a an example is a pin recess into which the positioning element 3 moves when the component holders 1 and 5 are moved towards one another into the illustrated joining position and which is closed by the component holder unit 1, 5 formed by the component holders 1 and 5.

The clamping device also has a clamping structure 10 with a first structure part 11 permanently connected to the component holder 1 and a second structure part 12, 13 permanently connected to the component holder 5. The structure parts 11 and 12, 13 are fixedly connected to one another by means of a releasable connection. In the state illustrated, the clamping structure 10 absorbs the clamping force by means of which the components B1 and B2 are pressed against one another in the clamping direction X and thus clamped in the joining position. As a whole, the clamping structure 10 has the shape of a frame or double arch, which extends around the component holders 1 and 5 and the components B1 and B2 held in them on two opposing sides of and at a distance from the peripheral edge.

The clamping structure 10 has a central joint element 14, projecting out from which are two beam-shaped straight arms, which together form the structure part 11. The structure part 11 and the joint element 14 form a single rigid part. Together with a joint element 24, the joint element 14 forms a rotating joint with a joint axis X pointing in the clamping direction X. The joint element 24 extends centrally in the X direction from the external face of the component holder 1 and is rigidly connected to it. The component holder 1 is connected via the joint element 24 and a docking member 20 to an actuator which can be moved in space, preferably the end of a robot arm. Together with the docking member 20, the joint element 24 forms a connecting joint 20, 24 constituting another rotating joint, the joint axis of which is also the X axis. The joint element 24 is therefore able to move in rotation about the X axis relative to both the clamping structure 10 and the docking member 20. The docking member 20 has a connection 21 in the form of a connecting flange. The connection 21 provides a connection to the actuator. The connection end of the actuator to which the docking member 20 is attached is able to move in rotation about a Y axis perpendicular to the X axis. The two axes X and Y are the two outermost motional axes of the actuator and define two degrees of freedom of the rotating movement. Projecting out rigidly from a central region of the docking member 20 in the direction of the X axis on both sides is a respective leg, which forms a joint element 22 for the joint connection to the joint element 24. As result, the clamping device as a whole can be pivoted about the Y axis and the component holders 1 and 5 can be rotated about the X axis.

The structure part 11 is rigidly connected to the docking member 20, i.e. so that it can not move relative to the docking member, via a connection 23. When the component holders 1 and 2 are rotated by means of a drive of the actuator relative to the docking member 20 about the X axis, the clamping device 10 does not follow this rotating movement but moves in the opposite direction relative to the component holders 1 and 2. The connection 23 comprises two bracket elements, each of which is connected via a connecting ring to the joint element 22 so as to rotate in unison with it and thus rotate in unison with the docking member 20, whilst the oppositely lying ends are connected to the structure part 11. The connection to the structure part 11 may be a fixed, permanent connection, for example a screw connection or material joint, or preferably a pure press-fit connection.

The second structure part 12, 13 of the clamping structure 10 is connected to the support of the component holder 5 in a rotating joint so as to move in rotation. The rotating joint may be seen in FIG. 2 in particular. The support of the component holder 5 forms one of the link elements of this rotating joint. The other link element is denoted by reference 15 and is disposed centrally and rigidly on the arm 12. The X axis is also the joint axis of this joint 5, 15. The second structure part 12, 13 is U-shaped with a continuous transverse beam which forms an arm 12 parallel with the structure part 11 and extends beyond the points of the peripheral edge of the component holders 1 and 5 and components B1 and B2 disposed farthest away from one another. A respective connecting beam 13 projects vertically out from each of the two outer ends of the arm 12 towards the structure part 11. The structure part 12, 13 therefore has the shape of a U open towards the structure part 11. In the connected state, the structure part 11 closes off the open end of the U-shaped structure part 12, 13.

The structure parts 11 and 12, 13 are rigidly joined to one another by means of a coupling which can be automatically closed and automatically released so that the components B1 and B2 are able to absorb the clamping force needed for clamping purposes. More specifically, the clamping force is generated by means of the clamping structure 10 and transmitted to the component holders 1 and 5 via the joints 5, 15 and 14, 24. The component holders 1 and 5 are clamped to one another, with their internal faces facing one another and pointing in the clamping direction X, by the resultant clamping force so that the components B1 and B2 are pressed sufficiently firmly against one another all over across their peripheral edge.

The coupling comprises two first coupling halves 16, one each being disposed at one of the two outer ends of the structure part 11, and two second coupling halves 17, one each being disposed at one of the two ends of the structure 12, 13 which ends each are free in the released state. The clamping force is generated by the coupled engagement of the two first coupling halves 16 and the respectively co-operating second coupling halves 17. The structure part 11 is pressed against the structure part 12, 13 in the clamping direction X due to the co-operation of the coupling halves 16 and 17. The structure part 11 thus constitutes a yoke. The clamping structure 10 forms two closed circuits for transmitting force which meet in the central region in the connecting points of the clamping structure 10 and the component holders 1 and 5, i.e. in the joints 14 and 15, from where the force is transmitted and distributed via a respective base to the component holders 1 and 5 and also separately pull the two arches of the clamping structure 10, i.e. one of the respective pairs of coupling halves 16 and 17.

FIG. 3 is a cross-section illustrating the geometry of the peripheral edge of components B1 and B2. Component B1 has a flange extending at an angle in the direction towards component B2 which is folded completely over against a sheet edge of component B2 during the hemming process and thus creates a fixed fold connection. The flange of component B1 is folded over successively in several hemming steps, for example two or three hemming steps. The initial geometry is shown by a solid line, whilst an intermediate step and the final state after hemming are indicated by broken lines. The hemming rollers 30a and 30b needed for a two-stage hemming process are also indicated by broken lines.

As mentioned above, the clamping structure 10 is made up of two parts and the two parts, namely the structure part 11 incorporating the joint element 14 on the one hand and the structure part 12, 13 incorporating the joint element 15 on the other hand, are releasably connected to one another by means of a coupling. This also results in two clamping device parts which can be released from one another and manipulated separately from one another in the released state, namely a first clamping device part incorporating the component holder 1 and a second clamping device part incorporating the component holder 5 and the respective co-operating part of the clamping structure 10. The two clamping device parts can be released from one another by the same coupling and manipulated separately from one another in the released state.

FIG. 4 is a perspective view onto the internal face of the support bed 4 illustrating the first clamping device part. Component B1 is indicated by broken lines but is shown as though it were transparent. As illustrated, the grips 2 are distributed across the internal face of the support bed 4 and extend through the support bed 4. Also illustrated is the positioning element 3, which extends through the support bed 4 and projects beyond its internal face in the clamping direction X of the component holder 1. FIG. 4 also illustrates the second coupling halves 16 open towards the clamping direction X. The coupling halves 16 each have a docking end 16a directed towards the clamping direction X. On their docking end 16a, the coupling halves 16 each have a plate-type docking surface extending transversely to the clamping direction X for the respective co-operating coupling halves 17.

FIG. 5 is a perspective view onto the internal face of the component holder 5, illustrating the second clamping device part separately. Distributed across its support are several support surfaces 6 on which the second component B2 can be placed. By means of the support surfaces 6, the support therefore forms a support bed 6 for the second component B2. The positioning element 8 is a pin recess and co-operates with the positioning element 3 provided in the form of a centring pin. The positioning elements 7 serving as a guide extending in the clamping direction X of the component holder 5 as far as the support 5 to the degree that they move into a guiding contact by means of their contours constituting the positioning arrangement when the component B2 is being positioned before the component B2 makes contact with the support surfaces 6. The component holder 5 has other positioning elements 9 which are used to position the component holder 5 at a depositing point in the joining station. The positioning elements 9 are provided in the form of bores in the support, for example. Co-operating positioning elements are disposed at the depositing point in the joining station, which are projecting positioning pins in the embodiment illustrated as an example, which move into the bores as the component holder 5 is being positioned at the depositing point. The second clamping device part is placed in a predefined position at the depositing point of the joining station with its bottom face on an underlying support so that it sits on the underlying support and is fixed in five degrees of freedom of movement by means of the structure part 12, 13. The sixth degree of freedom, which in the embodiment illustrated as an example is the ability of the component holder 5 to rotate relative to the structure part 12, 13, is fixed due to the co-operation of said positioning elements 9 and co-operating positioning elements. Instead of providing the positioning elements 9 and co-operating positioning elements in the form of bores and pins, it would also be possible to use the outer edge of the support of the component holder 5 as a positioning element for the second clamping device part; an appropriate stop would then be provided for the support at the depositing point. FIG. 5 also illustrates the two second coupling halves 17 in a view looking onto their docking end 17*a*. The two coupling halves 17 each have a docking surface on their docking ends 17*a* for the co-operating coupling half 16. The docking surfaces of the coupling halves 17 are also of a plate-shaped design and extend transversely to the clamping direction X.

FIG. 6 illustrates a first coupling half 16 and a second coupling half 17 released from the clamping structure 10 adjacent to one another. The other two co-operating coupling halves 16 and 17 correspond to those illustrated in FIG. 6. The coupling half 17 has a pin or bolt type coupling finger 19 at the docking end 17*a*, projecting out from the docking surface in the clamping direction X. The coupling finger 17 is disposed centrally on the docking surface. It has a thickening 19*a* extending around the X-axis in a middle region. The thickening 19*a* forms a projection behind which the first coupling half 16 can locate. The coupling half 16 has a coupling recess 18 for the coupling finger 19. The coupling recess 18 is cylindrical, conforming to the shape of the coupling finger 19 and open at the docking end 16*a* so that the coupling finger 19 can move into the coupling recess 18 in the clamping direction X as viewed from the component holder 5 in order to establish the coupled engagement and thus fixedly connect the two clamping device parts to one another. The coupling recess 18 is also centrally disposed on the docking surface of the coupling half 17. The coupling half 16 also has several engaging elements, such as spheres, pins or bolts, which are displaceably guided transversely to the clamping direction X, preferably at a right angle to the clamping direction X. Lateral bores may be seen in the coupling recess 18. In the coupled engagement, one of the respective engaging elements projects radially into the cavity of the coupling recess 18 through each of the bores. The engaging elements locate behind the projection formed by the thickening 19*a* in the coupled engagement and thus hold the coupling finger 19 in the coupling recess 18. The thickening 19*a* becomes radially wider in the clamping direction X of the second component holder 5, either conically or preferably progressively in a trumpet shape, so that the coupling finger 19 is pulled by the engaging action of the engaging elements of the coupling half 16 in the clamping direction X of the component holder 5 into the coupling recess 18 and the two clamping device parts, in particular the two component holders 1 and 5, are clamped to one another in their respective clamping direction X. The docking ends 16*a* and 17*a* of the coupling halves 16 and 17 are also designed so that the docking surfaces are pressed against one another due to the coupled engagement. Accordingly, a defined clamping force is transmitted to the component holders 1 and 5 due to the coupled engagement. The distances between the engaging elements and the docking surface of the coupling halves 16 and the projection 19*a* and the docking surface of the coupling half 17 are selected accordingly.

In the coupled engagement, the engaging elements of the coupling half 16 are blocked or locked. To this end, the two coupling halves 16 each have a blocking element for the engaging elements. If necessary, several blocking elements may be provided for each coupling half 16. The blocking element is mounted in the relevant coupling half 16 so that it can move backwards and forwards in the clamping direction X, for example, and can be subjected to a pneumatic force from both end faces. By selectively pressurising one of the two ends, the blocking element is selectively moved into a blocking position or a release position. The blocking element forms a piston which can be pressurised from both ends. In the blocking position, it locks the engaging elements of the relevant coupling half 16 in the coupled engagement and in the release position, it releases the engaging elements so that the coupled engagement can be released. The coupling halves 16 are supplied with the requisite compressed air via the structure part 11. The blocking element may be of a conical shape in the clamping direction X, for example, and lies with its thicker region axially overlapping the engaging elements in the blocking position, whereas in the release position, it is moved so that its thinner region is axially on a level with the engaging elements and the engaging elements are therefore able to flex radially outwards in order to release the coupled engagement. The blocking process may also be operated electrically instead of pneumatically. In such embodiments, the supply of compressed air can be dispensed with; instead, an electric drive is provided for each coupling half 16 in order to operate the blocking elements and is activated by means of appropriate actuator signals, preferably by means of an actuator control.

FIG. 7 again illustrates the second clamping device part but with a component B2 placed on it. As illustrated in FIG. 7, the second clamping device part is deposited at the depositing point of the joining station and can be picked up with the component B2 already held by the first clamping device part. The second clamping device part is deposited at the depositing point in a defined position by means of the arm 12 and the positioning elements 9 so that the actuator is able to move to and pick up the deposited second clamping device part with the first clamping device part under the control of a programme. During the last phase of the approach, the actuator moves the first clamping device part in its clamping direction X so that the coupling fingers 19 of the two coupling halves 17 move into the coupling recesses 18 and are engaged by the engaging elements of the first coupling halves 16. The resultant coupled engagement is blocked by operating the blocking elements of the coupling halves 16, thereby establishing the fixed connection of the of the clamping device parts.

The second clamping device part is not only used to deposit components B2 in the joining station and thus set the joining station up but also fulfils another function as a removal device for the resultant joined unit.

Figure 8:
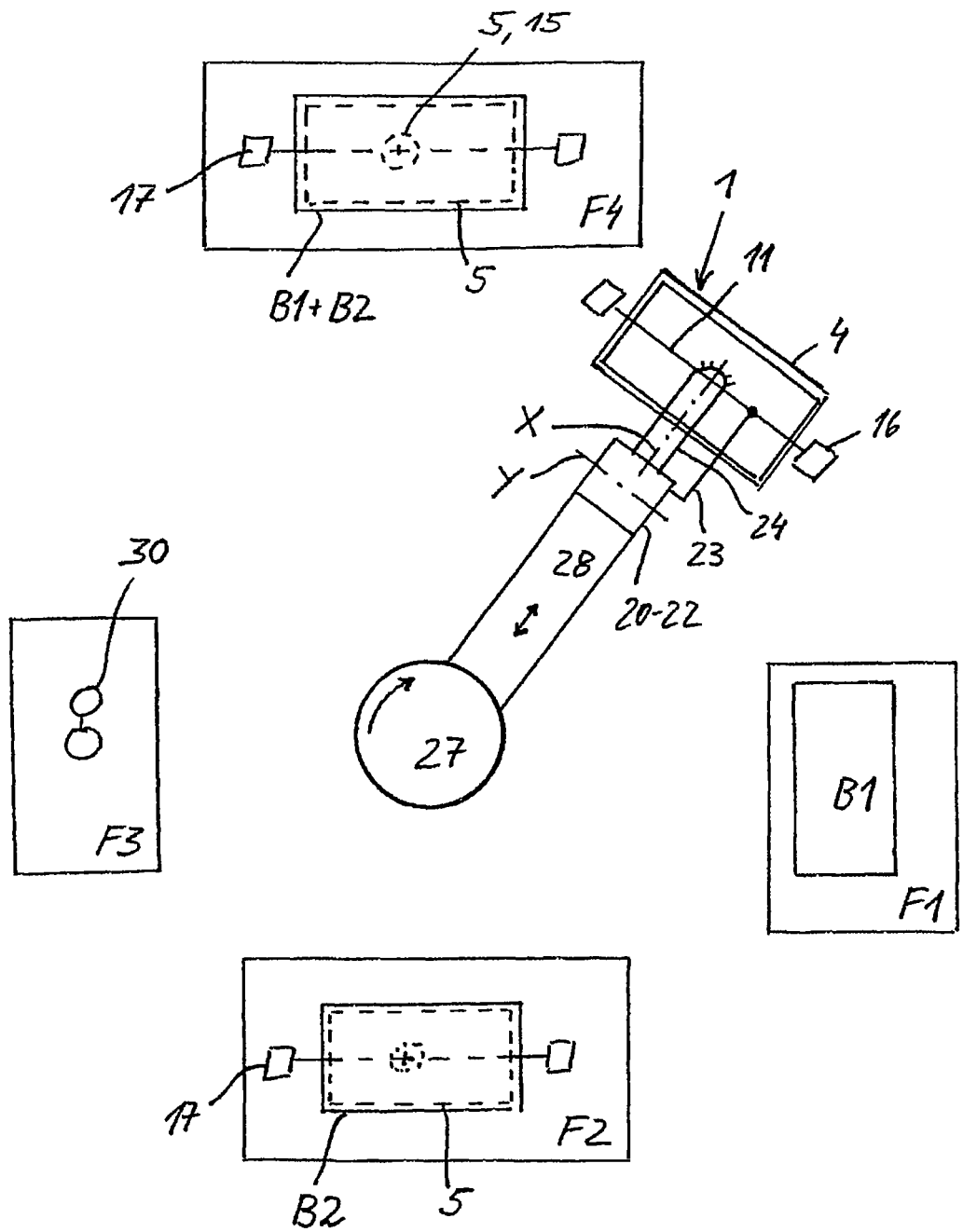
FIG. 8 illustrates a joining station for a first joining method.

FIG. 8 is a schematic diagram of an example of a joining station for running a first joining method. A robot is provided in the joining station, which has a stationary base 27 rotatable about a vertical axis and a robot arm 28 projecting out from the base 27 with a chain of rigid joint elements and the joints connecting the joint elements in pairs, which extend from the base 27 as far as a last one of the joint elements at the end of the robot arm 28. The first clamping device part is attached to the robot arm 28 constituting the actuator by means of the docking member 20 (FIGS. 1 and 2) so that the joint element 24 is the last joint element of the robot arm 28. Distributed around the robot base 27 are four sub-stations F1 to F4, alongside which move the robot moves in succession during a rotation. Several first components B1 are disposed one on top of the other in the first sub-station F1. The robot picks up the uppermost component B1 by means of the first clamping device part by positioning the first clamping device part relative to the component B1 and activating the grips 2 after this positioning operation so that the component B1 is held on the support bed 4 by means of suction.

In the next step, the robot rotates further to the second sub-station F2. The second sub-station F2 is the depositing point for the second clamping device part. The second clamping device part has already picked up a component B2. The relevant component B2 was deposited on the support bed 6 of the second component holder 5 beforehand, either manually or mechanically. The robot docks the first clamping device part at the second clamping device part, namely the two first coupling halves 16 on the two second coupling halves 17, and the two blocking elements block the coupling halves 16 to establish the coupled engagement. The two components B1 and B2 are now clamped relative to one another in the joining position.

The robot moves the clamping device with the components B1 and B2 disposed in the joining position to the third sub-station F3, the actual joining station. A stationary joining tool 30, preferably a roller hemming tool, is disposed at the station F3. The robot positions the clamping device so that the joining tool 30 is disposed at a specific point of the seam joint to be produced. Once this start position in the station F3 has been reached, the robot moves the clamping device in a predefined manner so that the peripheral edge is pulled in a closed circuit through the joining tool 30 as it were. This movement of the clamping device and accordingly the clamped components B1 and B2 specifically comprises a rotating movement of the clamping device about the X axis (FIGS. 1 and 2). It preferably consists of such a rotating movement. Since the component holders 1 and 5 are rigid, in particular are rigidly connected so as to rotate in unison along the X axis of the last joint element 24 of the robot arm 28, and the clamping structure 10 is rigidly connected to the Y axis directly upstream and in this sense is tied to the Y axis, the component holders 1 and 5 rotate about the X axis relative to the clamping structure 10. The joining tool 30 can therefore move in a closed circuit along the peripheral edge of the components B1 and B2 relative to the components B1 and B2 unobstructed by the clamping structure 10. In the embodiment illustrated as an example with the frame-type clamping structure 10, the joining tool 30 is always disposed at a point between the two connecting beams 13 and the coupling halves 16 and 17 during the joining process. These outer regions of the clamping structure 10 run before and after the joining tool 30 as viewed from the position of the component holders 1 and 5. In order to speed up the joining process, two stationary tools 30 may be provided in the station F3, for example, in which case they will act on opposite ends of the peripheral edge.

Once the seam join has been completed, the robot moves the clamping device into the fourth and last sub-station F4. The clamping device is positioned and deposited on the bottom face of the second clamping device part in the station F4. After the depositing operation, the robot releases the coupling 16, 17 and lifts the first clamping device part up off the deposited second clamping device part. Whilst the robot runs the described work cycle again, the joined unit made from the components B1 and B2 is taken out of the second clamping device part. The second clamping device part is now once more ready to receive another second component B2. If the cycle times in the individual stations F1 to F4 permit, the same second clamping device part is positioned in the second station F2 again in readiness for the subsequent work cycle. If the cycle times of the individual stations do not permit this, the station is equipped with a further second clamping device part so that the two clamping device parts can be used in alternation.

Figure 9:
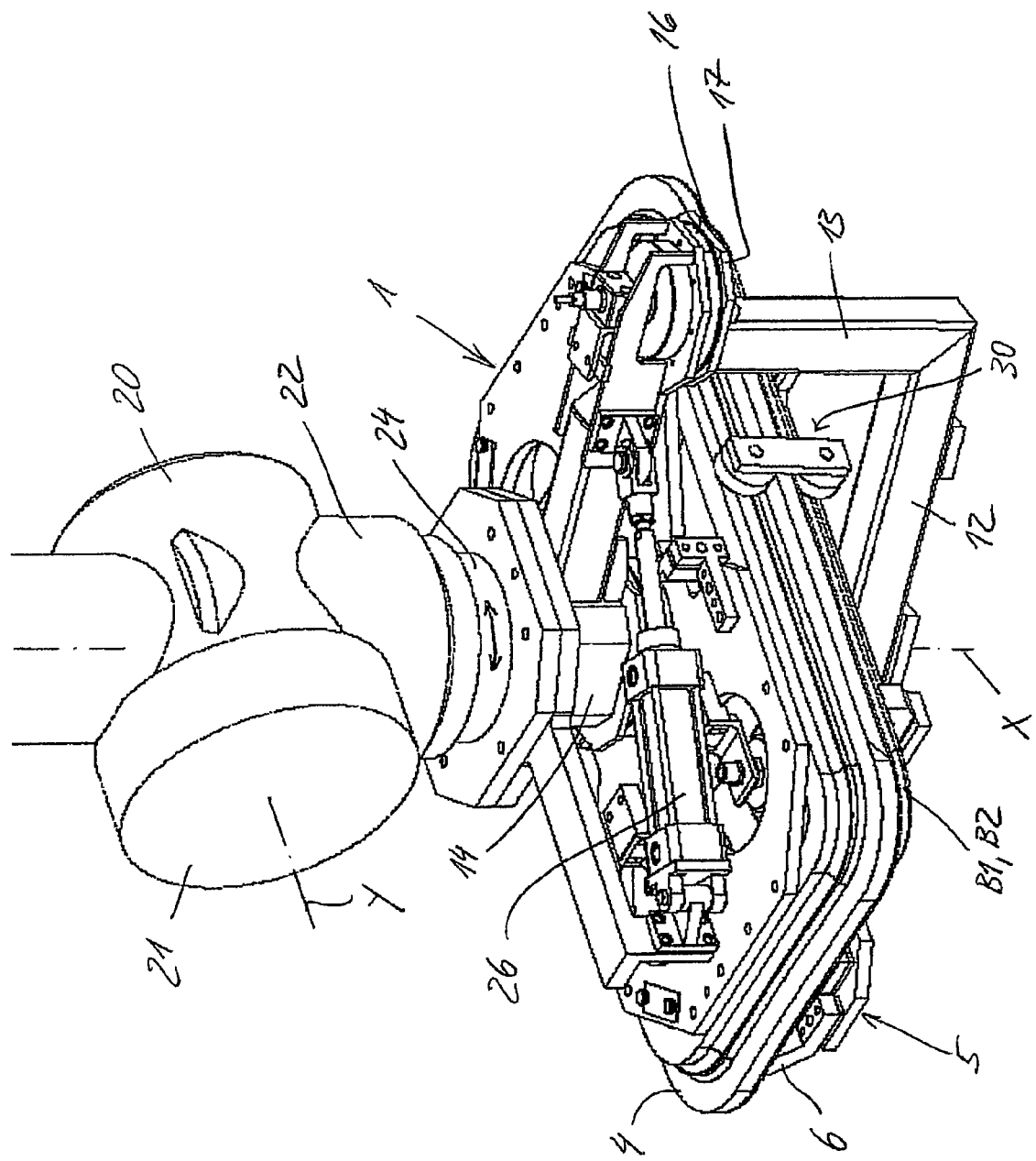
FIG. 9 is a perspective view of a clamping device of a second example embodiment.
Figure 10:
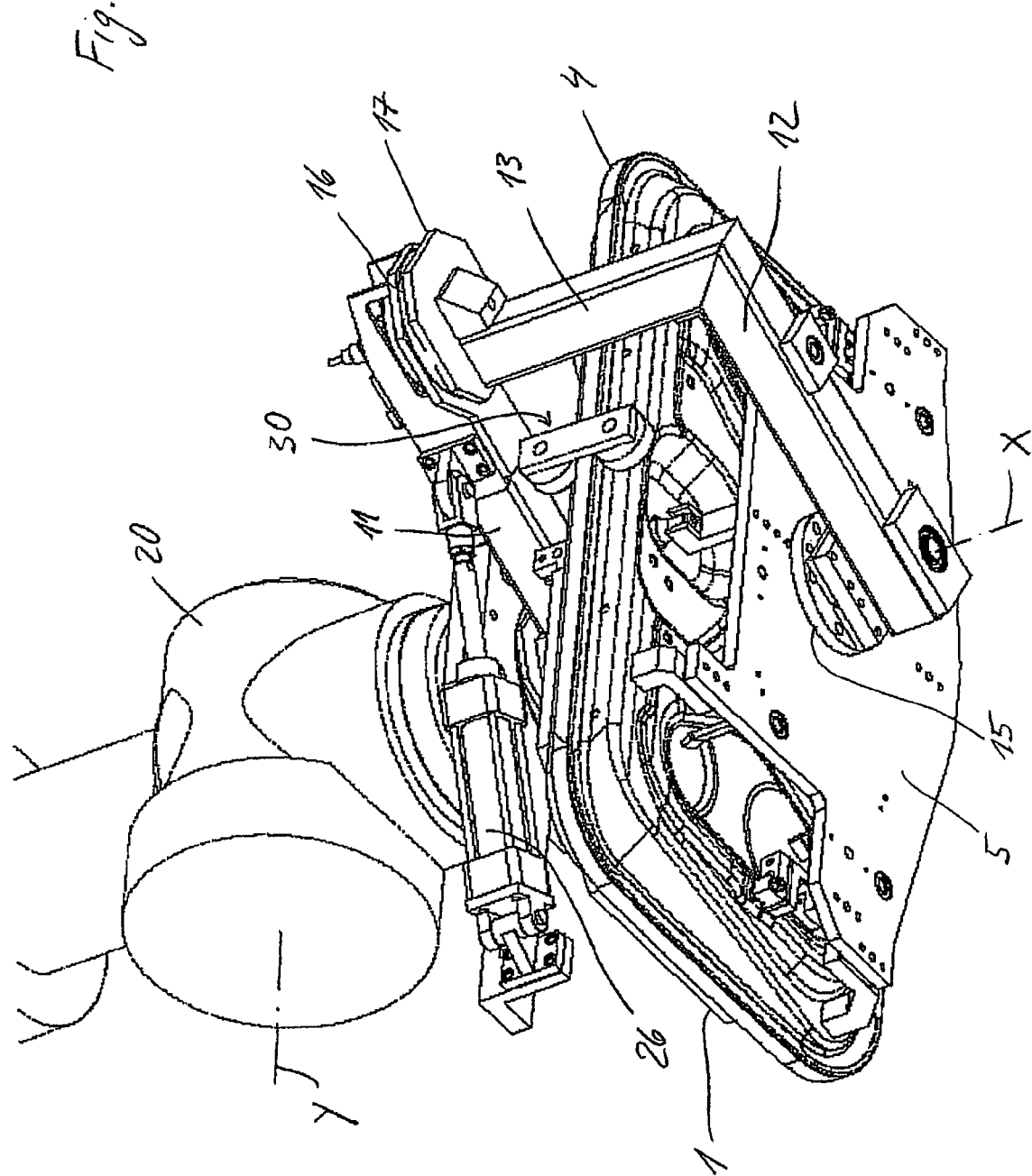
FIG. 10 is another view of the clamping device based on the second example embodiment and FIG. 11 illustrates a joining station for a second joining method.

FIGS. 9 and 10 illustrate a clamping device based on a modified second example embodiment. The component holders 1 and 5 correspond to those described with reference to the first example embodiment. Only those aspects which are different from the first embodiment will be described and reference may be made to the description of the first embodiment for other details. Accordingly, the same reference numbers are used to denote components fulfilling the same function as those described in connection with the first example embodiment.

The clamping structure 10 comprises only a single arch, which extends around the peripheral edge of the component holders 1 and 5 in the same way as each half of the double-arch of the first embodiment. In terms of its mechanical aspects and geometry, the clamping structure 10 corresponds to each of the individual ones of the two halves of the double arch of the first embodiment. The same applies in particular to the coupling halves 16 and 17, of which there are only two in total in the second embodiment.

The clamping device of the second embodiment has a separate drive 26 for generating the relative movement between the clamping structure 10 and the clamped component holders 1 and 5. The drive 10 is a pneumatic linear drive comprising a cylinder and a piston with a piston rod. The cylinder is attached to the component holder 1 and the piston rod is attached to the clamping structure 10 at the opposite end, in this example of an embodiment to its structure part 11. The fixing arrangement is stationary in each case but designed to move in rotation so that the drive 26 is able to compensate for the pivoting movements of the clamping structure 10 which it can generate. By contrast with the first embodiment, the relative movement is not generated by a drive of the actuator but by a separate drive 26 of the clamping device. The clamping device can therefore be attached to the actuator via the joint element 24, which is rigidly connected to the component holder 1. The joint 14, 24 is provided as before, however. At the joint 14, 24, the component holders 1, 5 on the one hand and the clamping structure 10 on the other hand are able to move relative to one another and in the embodiment illustrated as an example are so by a rotating movement. The pneumatic drive 26 may be replaced by an electric drive.

The perspective views of FIGS. 9 and 10 illustrate one of the two extreme positions which the clamping structure 10 is able to assume relative to the component holders 1 and 5. Also indicated is a roller hemming tool 30, more specifically a co-operating pair of finishing hemming rollers, the bottom roller of which is the hemming roller which rolls on the flange to fold the flange over (FIG. 3), whilst the top roller serves as the counter-roller and rolls on a track of the support bed 4. Instead of such a pair of rollers, it would be possible to provide only the hemming roller which rolls on the flange of component B1; this being the case, however, the robot would have to absorb the force necessary for the hemming operation. The preferred embodiments of roller hemming tools therefore also have a counter-roller for each hemming roller. The support bed 4 is specially shaped for the counter-roller at its external face remote from and opposite the peripheral edge of the component B1 with a path for the counter-roller following the peripheral edge of the component B1.

The clamping device of the second embodiment may be used in the same way as the clamping device based on the first embodiment with the exception of the described differences and may therefore be used for a joining process of the type described as an example.

Figure 11:
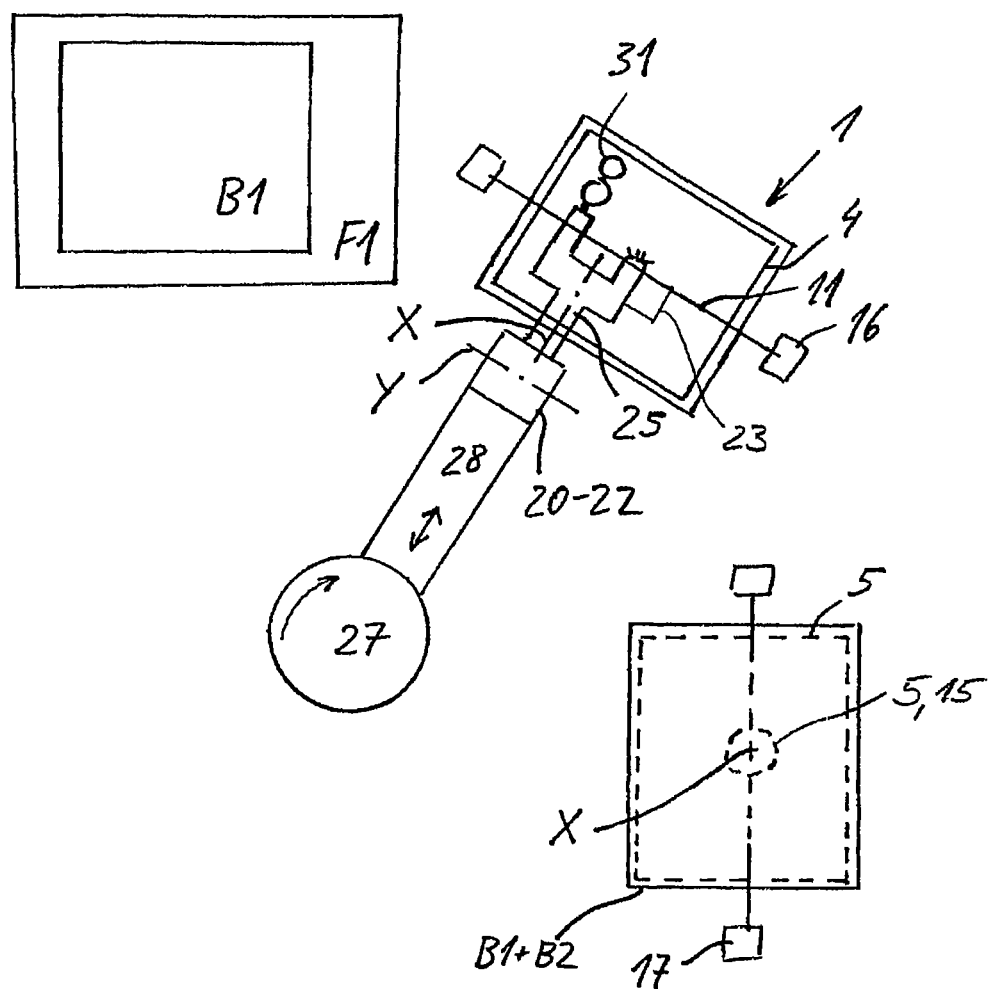

FIG. 11 is a schematic diagram illustrating an example of a joining station for running a second joining method. The joining station comprises only two sub-stations F1 and F2. Components B1 are deposited in the sub-station F1. The stations F1 of the two embodiments are identical. However, the second component holder 5 is stationary in the sub-station F2 and is not able to move. Apart from the fact that the component holder 5 is stationary, the component holder 5 and the structure part 12, 13 may form the described second clamping device part.

The robot 27, 28 corresponds to the robot illustrated in the joining station of FIG. 8, including its penultimate joint element 20-22. However, a joint element 25 which is different from the joint element 24 forms the last joint element of the robot arm 28 from the base 27. The joint element 25 is forked. The component holder 1 is secured to one fork end. To this extent, the disposition of the joint element 25 and component holder 1 is the same as the described combination of the joint element 24 and component holder 1. Disposed on the other fork end is a joining tool 31. The joining tool 31 as such may correspond to the joining tool 30. It comprises at least one hemming roller and preferably also a counter-roller for the hemming roller, as indicated in FIG. 11. The joining tool preferably has at least one other hemming roller.

The at least two hemming rollers of such an embodiment are disposed on the fork end at an angle with respect to one another and can be selectively moved into the operating position. Patent specification EP 1 420 908 A1 describes a roller hemming head which in particular may be disposed on the fork end of the joint element 25. The relevant fork end may also be provided in the form of a joint to enable several hemming rollers to be moved selectively into the operating position. As an alternative to a roller hemming head or fork end with hemming rollers which can be selective moved into the operating position, it may also be of advantage to use the joining tool described in patent specification EP 06 001 600 on the fork end; this joining tool does not require an additional joint at the fork end because it comprises several hemming rollers which are disposed before and after one another in the same operating path.

The first clamping device part may specifically be the first clamping device part illustrated in FIGS. 1 to 7 or the first clamping device part illustrated in FIGS. 9 and 10, the only difference being that a connection 23 connects the first structure part 11 rigidly to the joint element 25 and not to the joint elements 20-22. The connection 23 is a releasable connection and is designed so that the robot 27, 28 is able to release it automatically.

The joining cycle again starts in the sub-station F1 with the robot 27, 28 picking up the next component B1 with the component holder 1. After picking it up, the robot 27, 28 moves the component holder 1 with the held component B1 into the sub-station F2 and docks the first clamping device part by means of the coupling halves 16 and 17 on the second clamping device part. Having established and blocked the coupled engagement, the connection between the joint element 25 and the component holder 1 is released. The connection 23 is likewise released. Clamped together, the component holders 1 and 5 now remain stationary in the sub-station F2 and are not able to move at all.

Once the robot arm 28 has been released from the component holders 1 and 5 and the structure part 11, the robot 27, 28 moves the joining tool 31 to the start position for the joining process and then moves the joining tool 31 along the peripheral edge in order to produce the hemmed join. The clamping structure formed by the coupled engagement of the coupling halves 16 and 17 is also moved in conformity with the movement of the joining tool 31 as described in connection with the other example embodiments so that the joining tool 31 is able to move alongside the peripheral edge of the components B1 and B2 in a closed revolution. The clamping structure may be moved by means of a drive disposed on the second clamping device part. The drive may act directly on the joint element of the component holder 5 constituting the joint 5, 15, for example. In such an embodiment, the rotor of a rotary motor, preferably an electric rotary motor, may be rigidly connected to the joint element of the component holder 5 so as to rotate in unison with it.

After the joining operation, the joining tool 31 is moved out of the operating position and the joint element 25 is connected to the component holder 1 again. The coupled engagement of the coupling halves 16 and 17 is released and the component holder 1 is lifted off the component holder 5. The joined unit made from components B1 and B2 now sits freely on the component holder 5 and is taken out of the component holder 5 whilst the robot 27, 28 is already moving the first clamping device part back to the first sub-station F1 in readiness for the next cycle.

The invention claimed is:

1. A clamping device for components to be joined, which clamping device comprises:
    a first component holder for a first component,
    a second component holder for a second component,
    and a clamping structure which secures the component holders relative to one another in a joining position,
    and when the component holders are in the joining position, the clamping structure extends from an external face of the first component holder to an external face of the second component holder facing away from the external face of the first component holder and extends respectively around a peripheral edge of the component holders,
    wherein the clamping structure comprises a first structure part connected to the first component holder and a second structure part connected to the second component holder, and the structure parts can be connected to one another and released from another, and the region of the clamping structure extending around the peripheral edge can be moved relative to the component holders by pivoting about a rotation axis coinciding with a clamping direction,
    wherein the clamping structure forms a frame which extends around the component holders on two sides of the peripheral edge.

2. The clamping device as claimed in claim 1, wherein the clamping structure forms at least one arch which extends round the peripheral edge.

3. The clamping device as claimed in claim 1, wherein at least a region of the clamping structure extending around the peripheral edge of the component holders is able to move relative to the peripheral edge of the component holders so that the position of the region extending around can be moved in a longitudinal direction of the peripheral edge.

4. The clamping device as claimed in claim 1, wherein the component holders are clamped or can be clamped to one another in the clamping direction by the clamping structure and the region of the clamping structure extending around the peripheral edge can be moved relative to the component holders transversely to the clamping direction.

5. The clamping device as claimed claim 1, wherein the clamping structure can be moved about the rotation axis as a whole relative to the component holders, preferably pivoted or rotated.

6. The clamping device as claimed in claim 1, wherein the clamping structure is connected to the first component holder so as to be displaceable in a first joint and to the second component holder so as to be displaceable in a second joint.

7. The clamping device as claimed in claim 6, wherein the joints have a common joint axis.

8. The clamping device as claimed in claim 6, wherein the joints are each disposed in a central region of the component holders.

9. A clamping device for components to be joined, which clamping device comprises:
   a first component holder for a first component,
   a second component holder for a second component,
   a clamping structure which secures the component holders relative to one another in a joining position, and when the component holders are in the joining position, the clamping structure extends from an external face of the first component holder to an external face of the second component holder facing away from the external face of the first component holder and extends respectively around a peripheral edge of the component holders, wherein the clamping structure comprises a first structure part connected to the first component holder and a second structure part connected to the second component holder, and the structure parts can be connected to one another and released from another, and the region of the clamping structure extending around the peripheral edge can be moved relative to the component holders by pivoting about a rotation axis coinciding with a clamping direction, and
   an automatically operable coupling with a first coupling half which is connected to the first structure part and a second coupling half which is connected to the second structure part.

10. The clamping device as claimed in claim 9, in which the coupling can be operated by electric power or fluid power.

11. The clamping device as claimed in claim 9, wherein the component holders are clamped or can be clamped to one another in the clamping direction by means of the clamping structure and the coupling halves are connected to one another in a coupled engagement so that they can not move one to the other in the clamping direction.

12. The clamping device as claimed in claim 11, wherein the coupling halves are clamped to one another in the clamping direction.

13. The clamping device as claimed in claim 1, wherein at least one of the component holders has at least one grip for holding one of the components in a suspended arrangement.

14. The clamping device as claimed in claim 1, wherein at least one of the component holders has support surfaces for setting down one of the components.

15. The clamping device as claimed in claim 14, wherein at least one of the component holders has at least one positioning element for positioning the component relative to the component holder.

16. The clamping device as claimed in claim 1, comprising a docking member and a connecting joint in which the first component holder is connected to the docking member so that it is able to move in relation to the docking member and the docking member has a connection for establishing a mechanical connection to an actuator that is able to move freely in space.

17. The clamping device as claimed in claim 16, wherein at least a region of the clamping structure extending round the peripheral edge of the component holders is connected to the docking member so that it can not move by reference to a degree of freedom of movement of the connecting joint.

18. A clamping device for components to be joined, which clamping device comprises:
   a first component holder for a first component,
   a second component holder for a second component,
   a clamping structure which secures the component holders relative to one another in a joining position, and when the component holders are in the joining position, the clamping structure extends from an external face of the first component holder to an external face of the second component holder facing away from the external face of the first component holder and extends respectively around a peripheral edge of the component holders, wherein the clamping structure comprises a first structure part connected to the first component holder and a second structure part connected to the second component holder, and the structure parts can be connected to one another and released from another, and the region of the clamping structure extending around the peripheral edge can be moved relative to the component holders by pivoting about a rotation axis coinciding with a clamping direction, and
   wherein a robot arm with several joints and joint elements forming the joints in pairs support the clamping device and one of the component holders is connected to one of the joint elements and the clamping structure is connected to another of the joint elements.

19. The clamping device as claimed in claim 18, wherein the joint element to which one of the component holders is connected forms a free end of the robot arm which is able to move freely in space.

20. The clamping device as claimed in claim 18, wherein the robot arm forms a joint chain which extends from a base of the robot to an end of the robot arm which is able to move in space relative to the base, and the joint element to which the clamping structure is connected is closer in the joint chain to the base than the joint element to which one of the component holders is connected.

21. The clamping device as claimed in claim 1, with a drive by means of which one of the component holders and the clamping structure or at least a region of the clamping structure extending around the peripheral edge can be moved relative to one another.

22. The clamping device as claimed in claim 1, wherein one of the component holders has a hemming bed.

23. A method of joining components for use with a clamping device comprising a first component holder for a first component, a second component holder for a second component, and a clamping structure which secures the component holders relative to one another in a joining position, and when the component holders are in the joining position, the clamping structure extends from an external face of the first component holder to an external face of the second component holder facing away from the external face of the first component holder and extends respectively around a peripheral edge of the component holders, wherein the clamping structure comprises a first structure part connected to the first component holder and a second structure part connected to the second component holder, and the structure parts can be connected to one another and released from another, and the region of the clamping structure extending around the peripheral edge can be moved relative to the component holders by pivoting about a rotation axis coinciding with a clamping direction, the method comprising:

a) clamping the components relative to one another in a joining position by the clamping device,
b) joining the components to one another along a common peripheral edge with a joining tool, wherein the joining tool comprises at least one hemming roller and the components are joined to one another by a roller hemming process.

24. The method as claimed in claim 23, wherein one of the mutually clamped component holders and joining tool is moved in space relative to the other as the components are being joined so that the components are joined to one another along a specific path to form the joined unit due to the relative movement between the component holders and the joining tool.

25. The method as claimed in claim 24, wherein the other of the component holders and joining tool is stationary, at least whilst the components are being joined.

26. The method as claimed in claim 24, wherein at least one of the clamping structure and joining tool is stationary in space during the joining operation.

27. The method as claimed in claim 23, wherein a support bed of the first clamping device part is used as a hemming bed.

28. A method of joining components for use with a clamping device comprising a first component holder for a first component, a second component holder for a second component, and a clamping structure which secures the component holders relative to one another in a joining position, and when the component holders are in the joining position, the clamping structure extends from an external face of the first component holder to an external face of the second component holder facing away from the external face of the first component holder and extends respectively around a peripheral edge of the component holders, wherein the clamping structure comprises a first structure part connected to the first component holder and a second structure part connected to the second component holder, and the structure parts can be connected to one another and released from another, and the region of the clamping structure extending around the peripheral edge can be moved relative to the component holders by pivoting about a rotation axis coinciding with a clamping direction, the method comprising:

a) clamping the components relative to one another in a joining position by the clamping device,
b) joining the components to one another along a common peripheral edge with a joining tool,
wherein the position of at least a region of the clamping structure extending around the peripheral edge is moved relative to the component holders in the longitudinal direction of the peripheral edge,
wherein the region of the clamping structure extending around the peripheral edge and the joining tool move along the peripheral edge in the same direction in at least one or more sections of the peripheral edge relative to the component holders.

* * * * *

UNITED STATES PATENT AND TRADEMARK OFFICE
CERTIFICATE OF CORRECTION

PATENT NO.        : 8,720,876 B2
APPLICATION NO. : 12/294772
DATED             : May 13, 2014
INVENTOR(S)       : Reith et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1600 days.

Signed and Sealed this
Twenty-ninth Day of September, 2015

Michelle K. Lee
*Director of the United States Patent and Trademark Office*